(12) United States Patent
Suzuki et al.

(10) Patent No.: US 7,070,034 B2
(45) Date of Patent: Jul. 4, 2006

(54) ELECTROMAGNETIC CLUTCH AND MANUFACTURING METHOD OF MAGNETIC PATH FORMING MEMBER THEREFOR

(75) Inventors: Kunihiko Suzuki, Gamagoori (JP); Hirokazu Harada, Chita-gun (JP); Koji Kamiya, Chiryu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 115 days.

(21) Appl. No.: 10/847,381

(22) Filed: May 18, 2004

(65) Prior Publication Data

US 2004/0231948 A1    Nov. 25, 2004

(30) Foreign Application Priority Data

May 19, 2003   (JP)  .............................. 2003-139880

(51) Int. Cl.
*F16D 27/112*  (2006.01)
*H01F 7/06*  (2006.01)

(52) U.S. Cl. ............... 192/84.96; 29/602.1; 192/84.91; 335/296

(58) Field of Classification Search ..................... None
See application file for complete search history.

(56) References Cited

U.S. PATENT DOCUMENTS 2,739,684 A * 3/1956 Meyer ....................... 192/84.3
2,860,403 A * 11/1958 Meyer ......................... 29/607
4,508,203 A * 4/1985 Packard et al. ............ 192/84.1
4,685,202 A * 8/1987 Booth et al. .................. 29/607
5,791,039 A * 8/1998 Tabuchi et al. ............ 29/602.1
6,510,932 B1 * 1/2003 Ikeda et al. ................ 192/84.7

FOREIGN PATENT DOCUMENTS

| EP | 0 867 630 A1 | 9/1998 |
| JP | 55-20905 | 2/1980 |
| JP | 11-153157 | 6/1999 |
| JP | 2000-230577 | 8/2000 |

* cited by examiner

*Primary Examiner*—Rodney H. Bonck
(74) *Attorney, Agent, or Firm*—Oblon, Spivak, McClelland, Maier & Neustadt, P.C.

(57) ABSTRACT

An electromagnetic clutch includes a first magnetic member with a large-diameter cylindrical portion made of a magnetic metal and a second magnetic member with a small-diameter cylindrical portion made of a magnetic metal and contained in the large-diameter cylindrical portion are joined to an annular member of a non-magnetic material interposed between the large and small-diameter cylindrical portions to constitute a magnetic path forming member. The outer and inner circumferential edges of the annular member are welded to the large-diameter cylindrical portion and the small-diameter cylindrical portion, with the front end surface of the annular member receding a second predetermined distance (L2) from the front end surfaces of the large and small-diameter cylindrical portions. Then, the front end surfaces of the large and small-diameter cylindrical portions are cut until the receded distance of the front end surface of the annular member becomes a first predetermined distance (L1).

7 Claims, 2 Drawing Sheets

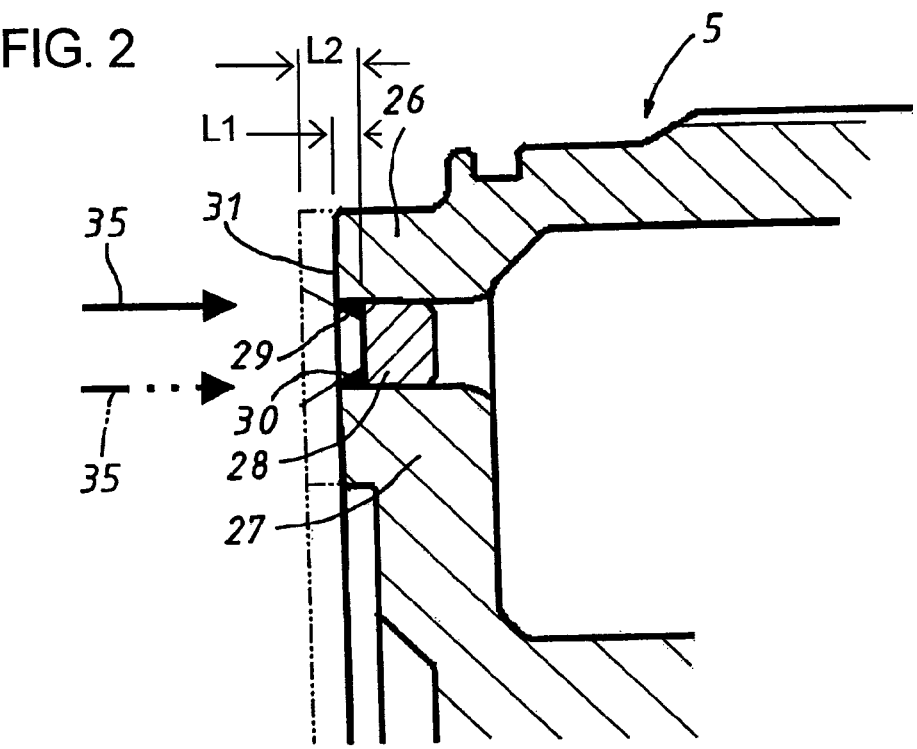
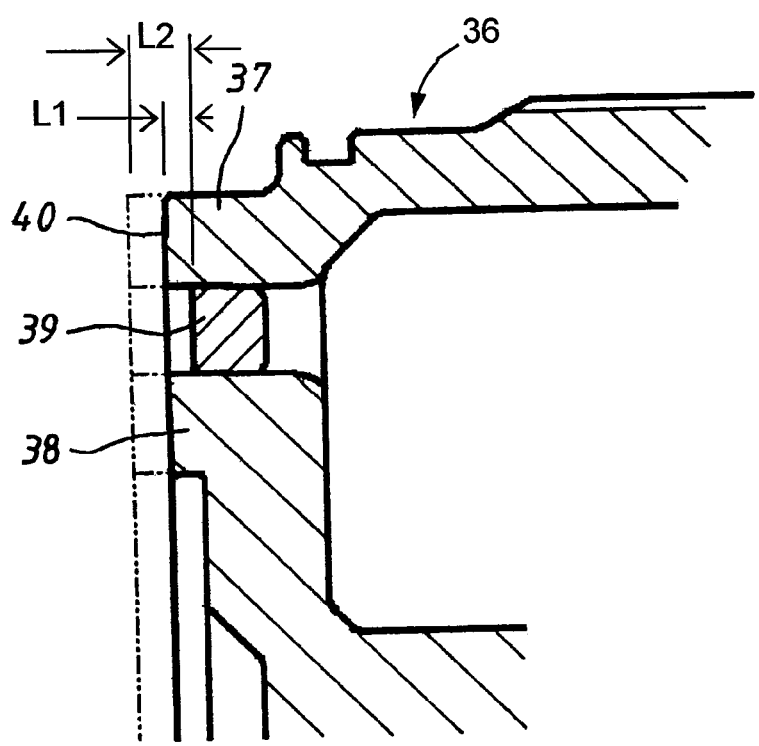

ELECTROMAGNETIC CLUTCH AND MANUFACTURING METHOD OF MAGNETIC PATH FORMING MEMBER THEREFOR

INCORPORATION BY REFERENCE

This application is based on and claims priority under 35 U.S.C. sctn. 119 with respect to Japanese Application No. 2003-139880, the entire content of which is incorporated herein by reference.

BACKGROUND OF THE INVENTION

1. Field of the Invention

The present invention relates to an electromagnetic clutch having a magnetic path forming member which faces a friction clutch at the opposite side to an armature for forming a magnetic path circulating from an electromagnetic. It also relates to a method of manufacturing such a magnetic path forming member for an electromagnetic clutch.

2. Discussion of the Related Art

Heretofore, there has been known an electromagnetic clutch of the type that a large-diameter cylindrical member and a small-diameter cylindrical member both made of iron as a magnetic material are welded and integrally joined at their front end portions respectively to the outer and inner surfaces of an annular member made of. stainless steel as a non-magnetic material thereby to constitute a magnetic path forming member. In the electromagnetic clutch of the aforementioned type, the front end surface of the magnetic path forming member is finished by cutting to form a clutch contact surface with which one end of a friction clutch is contactable, and an armature is arranged to face the other side of the friction clutch, while an electromagnet is arranged between the large and small-diameter cylindrical members behind the magnetic path forming member. The magnetic path forming member in the known electromagnetic clutch has the clutch contact surface which is poor in surface flatness for the following reason. That is, stainless steel is hard to cut compared to iron, and the welded portions where stainless steel and iron have been fused have been hardened. Thus, when the iron large and small-diameter cylindrical members and the annular member welded therebetween are cut, the welded portions and the front end portion of the stainless annular member have those portions left uncut and protruded slightly beyond the cut surfaces of the iron large and small-diameter cylindrical members.

To obviate this drawback, Japanese unexamined, published patent application No. 2000-230577 describes a manufacturing method capable of improving the flatness of such a clutch contact surface. In the known method, stepped portions are formed at the inner circumferential edge of a large-diameter cylindrical member as well as at the outer circumferential edge of a small-diameter cylindrical member to retract or recede from the front end surfaces of the both cylindrical members, and an annular member is interposed between the receding stepped portions to define an annular groove. Then, the large and small-diameter members both made of iron are welded to the stainless annular member at the bottom surface of the annular groove, and cutting is then performed on the front end surfaces of the large and small-diameter members only.

However, in the magnetic path forming member described in the aforementioned Japanese patent document, the large and small-diameter cylindrical members are provided at their inner and outer circumferential edges with the stepped portions which recede from the front end surfaces thereof. Thus, the area of the clutch contact surface which is formed by cutting the front end surfaces of the large and small-diameter cylindrical members after the welding to the stainless annular member is decreased by the area corresponding to the annular groove, so that the magnetic path area is diminished disadvantageously. Further, thinning the width in radial direction of the annular member may be conceived of in order to secure a necessary area for the magnetic path. However, this measure cannot be taken for the difficulties in manufacturing the annular member as well as in preventing the magnetic flux from leaking.

SUMMARY OF THE INVENTION

Accordingly, in view of solving the foregoing problems, it is a primary object of the present invention is to provide an improved electromagnetic clutch having a magnetic path forming member whose clutch contact surface is large in magnetic path area and good or satisfactory in flatness.

Briefly, in a first aspect of the present invention, an electromagnetic clutch is provided to be of the type that a first magnetic member with a large-diameter cylindrical portion made of a magnetic metal and a second magnetic member with a small-diameter cylindrical portion made of a magnetic metal and contained in the large-diameter cylindrical portion are bodily joined to an annular member of a non-magnetic material interposed between the large and small-diameter cylindrical portions to constitute a magnetic path forming member. In the electromagnetic clutch of the type, a friction clutch is arranged between a clutch contact surface formed on the front end surface of the magnetic path forming member and an armature, while an electromagnet is arranged behind the magnetic path forming member for generating magnetic flux between the large and small-diameter cylindrical portions. In the improvements of the electromagnetic clutch, the outer and inner circumferential edges of the annular member are joined by welding respectively to the inner circumferential edge of the large-diameter cylindrical portion and the outer circumferential edge of the small-diameter cylindrical portion, with the front end surface of the annular member receding more than a predetermined distance (L1) from the front end surfaces of the large and small-diameter cylindrical portions. Then, the clutch contact surface is formed by cutting the front end surfaces of the large and small-diameter cylindrical portions.

With this construction, since the clutch contact surface with good or satisfactory flatness is obtained by cutting the large and small-diameter cylindrical portions without cutting the annular member which is made of a hard-to-cut, non-magnetic material, any substantial air gap is hardly formed between the clutch contact surface and the end of the friction clutch. Therefore, it hardly occurs that the air gap causes the characteristic of the clutch to be degraded, or that oil flown into the air gap forms an oil film to lower the responsiveness of the clutch operation. Further, since the clutch contact surface is formed by cutting the front end surfaces of the large and small-diameter cylindrical portions and portions which are fused from parts of the large and small-diameter cylindrical portions to be deposited onto the annular member, the large and small-diameter cylindrical portions are given magnetic paths which are reliably separated by the non-magnetic member and sufficiently large in respective areas for magnetic flux, and the clutch contact surface can be improved in flatness in addition to being given such magnetic paths.

In another aspect of the present invention, there is provided a method of manufacturing a magnetic path forming member for an electromagnetic clutch of the aforementioned type. In the manufacturing method, the annular member is first positioned relative to the first and second magnetic members with the front end surface thereof receding more than a predetermined distance (L1) from the front end surfaces of the large and small-diameter cylindrical portions. Then, the outer and inner circumferential edges of the annular member are joined by welding respectively to the inner circumferential edge of the larger-diameter cylindrical portion and the outer circumferential edge of the small-diameter cylindrical portion so that the inner circumferential edge of the large-diameter cylindrical portion and the outer circumferential edge of the small-diameter cylindrical portion are melted and fused respectively to the outer and inner circumferential edges of the annular member. Thereafter, cutting the front end surfaces of the large and small-diameter cylindrical portions is performed to form the clutch contact surface.

According to the manufacturing method, without cutting the annular intermediate member as a non-magnetic member, cutting is performed on the front end surfaces of the large and small-diameter cylindrical portions as well as on the portions which are fused from parts of the large and small-diameter cylindrical portions to be deposited onto the annular intermediate member. Thus, the large and small-diameter cylindrical portions are given magnetic paths which are separated by the non-magnetic member and sufficiently large in respective areas for magnetic flux, and the clutch contact surface can be improved in flatness in addition to being given such magnetic paths.

BRIEF DESCRIPTION OF THE ACCOMPANYING DRAWINGS

The foregoing and other objects and many of the attendant advantages of the present invention may readily be appreciated as the same becomes better understood by reference to preferred embodiments of the present invention when considered in connection with the accompanying drawings, wherein like reference numerals designate the same or corresponding parts throughout several views, and in which:

FIG. 2 is a fragmentary schematic view showing a method of manufacturing a rear housing of the electromagnetic clutch shown in FIG. 2; and FIG. 3 is a fragmentary sectional view of a rear housing used in the second embodiment in place of that shown in FIG. 2.

DETAILED DESCRIPTION OF THE PREFERRED EMBODIMENTS

Figure 1:
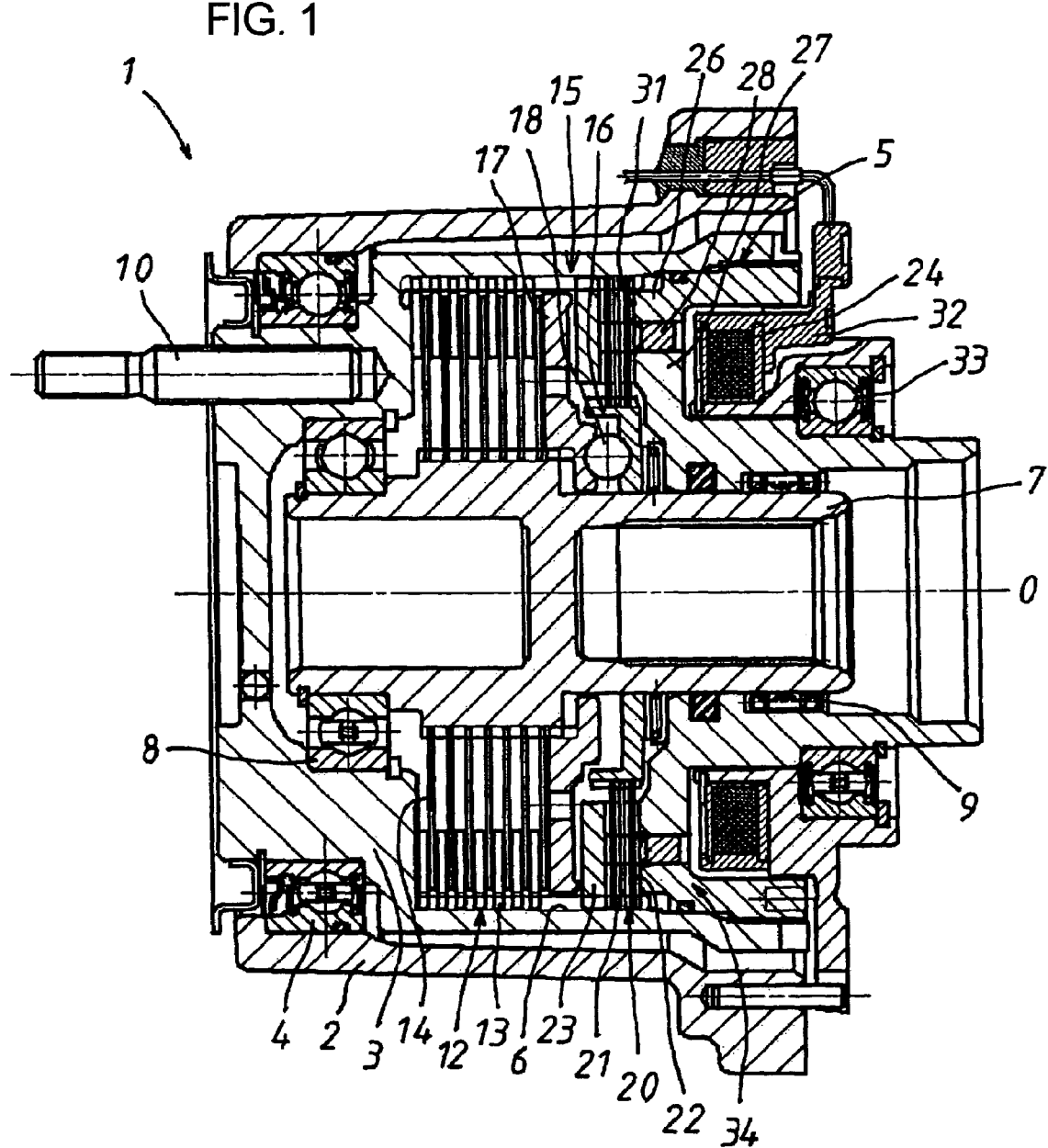
FIG. 1 is a longitudinal sectional view of an electromagnetic clutch in the first embodiment according to the present invention.

An electromagnetic clutch in the first embodiment according to the present invention will be described hereinafter with reference to the accompanying drawings. FIG. 1 illustrates a longitudinal section of a pilot-operated, electromagnetic clutch device 1 which incorporates an electromagnetic clutch 34 as one embodiment according to the preset invention. The pilot-operated, electromagnetic clutch 1 is arranged between a pair of front and rear propeller shafts (not shown) for controllably transmitting the drive power of, e.g., a combustion engine to rear wheel side. A numeral 2 denotes a clutch case which houses the pilot-operated, electromagnetic clutch 1 therein, and the clutch case 2 supports a bottomed, cylindrical housing 3 of the pilot-operated, electromagnetic clutch 1 through a bearing 4 rotatably about a rotational axis 0. A rear housing 5 constituting a magnetic path forming member is securely screwed into an opening end portion of the housing 3 and defines a clutch receiving chamber 6 closed air-tightly within the housing 3. A cave portion formed at the bottom portion of the housing 3 and an internal bore of the rear housing 5 respectively support both end portions of an inner shaft 7 by means of bearings 8, 9 rotatably about the rotational axis 0. Bolts 10 (one only shown) are protruded from the front end surface of the housing 3 to be connectable to the front propeller shaft (not shown). A spline hole formed at the rear end hole of the inner shaft 7 is adapted to receive the rear propeller shaft (not shown) therein through spline engagement.

Within the clutch receiving chamber 6, there is arranged a main clutch 12, which is composed of plural outer main clutch plates 13 and plural inner main clutch plates 14. The outer main clutch plates 13 are spline-engaged at outer portions thereof with an inner spline formed on the internal surface of the clutch receiving chamber 6 to be non-rotatable but axially movable relative to the housing 3, while the inner main clutch plates 14 are spline-engaged at inner portions thereof with an outer spline on the outer surface of an engaging portion, which is formed at an axial mid portion of the inner shaft 7, to be non-rotatable but axially movable relative to the inner shaft 7. Each of the outer main clutch plates 13 and each of the inner main clutch plates 14 are arranged in an alternate fashion and are brought into friction engagement when coming into contact with each other or out of friction engagement when going away from each other.

A cam-type amplifying mechanism 15 is arranged behind the main clutch 12 and is composed of a first cam member 16, a second cam member 17 and a plurality of cam followers 18. The second cam member 17 is spline-engaged at its internal surface with the outer spline on the outer surface of the engaging portion of the inner shaft 7 and is kept contacted with the main clutch 12 at one or front end surface thereof thereby to pressure the main clutch 12 by means of cam action. The first cam member 16 is supported on the inner shaft 7 to be freely rotatable relative thereto behind the second cam member 17 with the plural cam followers 18 being put between itself and the second cam member 17, and is located radially inside of an electromagnetic pilot clutch 20 referred to later. Each of the plural cam followers 18 takes a ball-like shape and is held engaged with mating cam grooves formed on the confrontation surfaces of the first and second cam members 16 and 17.

The pilot clutch 20 is composed of several outer pilot clutch plates 21 and several inner pilot clutch plates 22 and is arranged behind the second cam member 17. The outer pilot clutch plates 21 are spline-engaged with the inner spline formed on the internal surface of the clutch receiving chamber 6 to be non-rotatable but axially movable relative to the housing 3, while the inner pilot clutch plates 22 are spline-engaged with an outer spline formed on the outer surface of the first cam member 16 to be non-rotatable and axially movable relative to the first cam member 16. An armature 23 takes a ring shape, is arranged between the pilot clutch 20 and the second cam member 17 and is spline-engaged with the inner spline on the internal surface of the clutch receiving chamber 6 to be non-rotatable but axially movable relative to the housing 3. The armature 23 is to pressure the pilot clutch 20 when attracted by means of magnetic flux which an electromagnet 24 referred to later generates as a starting point.

The rear housing 5 is secured to the opening end portion of the housing 3 behind the pilot clutch 20. The rear housing 5 is composed of a large-diameter rear housing member 26 made of a magnetic metal and constituting a first magnetic member, a small-diameter rear housing portion 27 made of a magnetic metal and constituting a second magnetic member, and an intermediate member 28 made of a non-magnetic metal and constituting an annular member. The large-diameter rear housing member 26 taking a cylindrical shape is screwed into the internal surface of the opening end portion of the housing 3 and is secured by welding for example to the housing 3, with the rear housing 5 preliminarily pressuring the main clutch 12 through the cam-type amplifying mechanism 15. The small-diameter rear housing member 27 takes a stepped, cylindrical shape and rotatably carries the inner shaft 7 by means of a needle bearing 9. The intermediate member 28 taking an annular shape is interposed between the internal surface of the large-diameter rear housing member 26 and the external surface of the small-diameter rear housing member 27.

In manufacturing the rear housing 5, as shown in FIG. 2, the intermediate member 28 is held with its front end surface receding from the front end surfaces of the large-diameter rear housing member 26 and the small-diameter rear housing member 27. In this state, welding such as, for example, electron beam welding, laser beam welding or the like is performed from the front end surface side between the outer circumferential edge of the intermediate member 28 and the inner circumferential edge of the large-diameter rear housing member 26 and between the inner circumferential edge of the intermediate member 28 and the outer circumferential edge of the small-diameter rear housing member 27, whereby the large-diameter rear housing member 26 and the small-diameter rear housing member 27 both made of iron or the like as a magnetic material are integrally joined at their front end portions through the intermediate member 28 made of stainless steel or the like as a non-magnetic metal thereby to constitute the rear housing 5. The front end surfaces of the large and small-diameter rear housing members 26, 27 and bead welds 29, 30 are cut, whereby the clutch contact surface 31 is formed. The bead welds 29, 30 are those portions which are melted and fused by welding from parts of the large and small-diameter rear housing members 26, 27 to be deposited onto the outer and inner circumferential edges of the intermediate member 28. The distance between the clutch contact surface 31 and the front end surface of the intermediate member 28 is set to a first predetermined valve (L1). Preferably, it is set to a value within 0.1 through 1 millimeter.

The electromagnet 24 of a ring shape to which electric current is applied is secured to the yoke 32 at such a position that it is surrounded by the large and small-diameter rear housing members 26, 27 and the intermediate member 28. The yoke 32 is supported by means of a bearing 33 on the inner shaft 7 to be rotatable relative to the same with a small clearance relative to the large and small-diameter rear housing members 26, 27 and is kept engaged with a pin (not numbered) protruding from the rear end surface of the clutch case 2 to be prevented from being rotated relative to the clutch case 2. In this way, the large and small-diameter rear housing members 26, 27 which are respectively a large-diameter cylindrical member and a small-diameter cylindrical member each made of a magnetic metal are integrally joined at their front end portions to the intermediate member 28 which is an annular member made of a non-magnetic metal, so that the rear housing 5 constituting a magnetic path forming member is constituted. Further, the pilot clutch 20 constituted by a friction clutch is interposed between the clutch contact surface 31 formed at the front end surface of the rear housing 5 and the armature 23, and the electromagnet 24 is arranged between the large and small-diameter rear housing members 26, 27 behind the rear housing 5, so that the electromagnetic clutch 34 is constituted.

The operation of the pilot-operated, electromagnetic clutch 1 incorporating the electromagnetic clutch 34 will be described hereinafter. When the combustion engine (not shown) is started, the drive power of the engine is transmitted to the housing 3 through the front propeller shaft (not shown) thereby to drivingly rotate the housing 3. At the time of engine starting, the electromagnet 24 usually remains not given electric current. Thus, no magnetic flux is generated to keep the pilot clutch 20 out of engagement, and no pressuring force acts on the second cam member 17, so that the outer main clutch plates 13 and the inner main clutch plates 14 are in the state that they are not pressured upon each other. Accordingly, the outer main clutch plates 13 and the inner main clutch plates 14 are relatively rotated, so that the drive power is not transmitted from the housing 3 to the inner shaft 7.

On the other hand, when electric current is supplied to the electromagnet 24, magnetic flux having a starting point at the electromagnet 24 is generated to circulate through the small-diameter rear housing member 27, the pilot clutch 20, the armature 23 and the large-diameter rear housing member 26 to return to the electromagnet 24. This causes the armature 23 to be attracted and to pressure the pilot clutch 20 on the clutch contact surface 31 of the rear housing 5 to bring the same into friction contact. Therefore, relative rotation is effected between the first cam member 16 and the second cam member 17 of the cam-type amplifying mechanism 15, and the action of the cam followers 18 along the cam grooves causes the second cam member 17 to be moved in such a direction as to pressure the inner main clutch plates 14 of the main clutch 12 on the outer main clutch plates 13 thereof, whereby the main clutch 12 transmits a drive torque to which the friction engagement force of the pilot clutch 20 is amplified. The drive torque is transmitted from the inner shaft 7 to the rear propeller shaft and further, to rear wheels of the vehicle through a differential unit (both not shown).

In the device illustrated embodiment, the front end surface of the intermediate member 28 recedes or retracts by the first predetermined value (L1) from the front end surfaces of the large and small-diameter rear housing members 26, 27. The clutch contact surface 31 is formed by cutting the front end surfaces of the large and small-diameter rear housing members 26, 27 and the bead welds 29, 30 which are melted by welding from parts of the large and small-diameter rear housing members 26, 27 to be secured or deposited onto the intermediate member 28. Therefore, the intermediate member 28 made of stainless steel which is harder to machine than the iron large and small-diameter rear housing members 26, 27 does not protrude those parts left uncut from the clutch contact surface 31, and a magnetic path at the large-diameter member 26 side and another magnetic path at the small-diameter member 27 side which are separated by the non-magnetic member 28 can be secured to be good or satisfactory in flatness and sufficiently large in magnetic area. Since a substantial air gap is therefore hardly formed between the clutch contact surface 31 and the end surface of the pilot clutch 20 due to the good flatness at the clutch contact surface 31, it does not occur that when the armature 23 is attracted by the electromagnet 24 to pressure the pilot clutch 20 on the clutch contact surface 31 of the rear housing 5, either the clutch characteristic is degraded by the air gap, or the oil flown into the air gap causes the formation of an oil film thereby to lower the responsiveness in the clutch operation.

Next, detail description will be made as to a manufacturing method for the rear housing 5 which constitutes the magnetic path forming member for the electromagnetic clutch 34. As shown in FIG. 2, the inner diameter at the front end portion of the large-diameter rear housing member 26 and the outer diameter at the front end portion of the small-diameter rear housing member 27 are formed or machined to be substantially equal respectively to the outer and inner diameters of the intermediate member 28. Then, the intermediate member 28 is interposed and fit between the large and small-diameter rear housing members 26, 27 and is held at such a position that the front end surface thereof retracts or recedes by a second predetermined value (L2) within the range of, preferably, 0.2 through 2 millimeters from the front end surfaces of the large and small-diameter rear housing members 26, 27. Thereafter, the large and small-diameter rear housing members 26, 27 and the intermediate member 28 which are held in this positional relation are placed in a vacuous atmosphere, in which the state electron beam welding is performed. That is, an electron beam 35 is emitted from the front side of the assembly toward each of the fitting portions of the intermediate member 28 with the large and small-diameter rear housing members 26, 27 in the direction of the rotational axis 0. As a result, the inner circumferential edge portion of the large-diameter rear housing member 26 and the outer circumferential edge portion of the intermediate member 28 are melted and fused together to be deposited as the bead weld 29 around the outer circumferential edge portion of the intermediate member 28, and the outer circumferential edge portion of the small-diameter rear housing member 27 and the inner circumferential edge portion of the intermediate member 28 are melted and fused together to be deposited as the bead weld 30 around the inner circumferential edge portion of the intermediate member 28.

In this way, the electron beam welding is performed between the outer circumferential edge portion of the intermediate member 28 and the inner circumferential edge portion of the large-diameter rear housing member 26 as well as between the inner circumferential edge portion of the intermediate member 28 and the outer circumferential edge portion of the small-diameter rear housing member 27. In this case, the welding is carried out so that no connection is made across the beard welds 29, 30 which are fused by welding from parts of the large and small-diameter rear housing members 26, 27 to be deposited around the outer and inner circumferential edge portions of the intermediate member 28. After the welding, cutting such as, e.g., milling, turning or the like is performed on the front end surfaces of the large and small-diameter rear housing members 26, 27 as well as on the bead welds 29, 30. In this machining, the clutch contact surface 31 is formed by performing the cutting so that the distance between the front end surfaces of the large and small-diameter rear housing members 26, 27 and the front end surface of the intermediate member 28 becomes the first predetermined value (L1) such as within the range of 0.1 through 1 millimeter, preferably.

It is to be noted that the welding of the intermediate member 28 to the large and small-diameter rear housing members 26, 27 can be done by emitting, instead of the electron beam 35, a laser beam from the front side of the assembly toward each of the fitting portions of the intermediate member 28 with the large and small-diameter rear housing members 26, 27 in the direction of the rotational axis 0. Moreover, the intermediate member 28 and the large and small-diameter rear housing members 26, 27 may be welded otherwise than as described above.

SECOND EMBODIMENT

An electromagnetic clutch 34 in the second embodiment according to the present invention will be described hereafter with reference to FIG. 3. The electromagnetic clutch 34 in the second embodiment is different only in the rear housing from that in the first embodiment, and those in the first ant second embodiments take the same configuration in other components. Thus, the following description will be directed only to the rear housing 36 constituting a magnetic path forming member. As shown in FIG. 3, the inner diameter at the front end portion of a large-diameter rear housing member 37 as a large-diameter cylindrical member and the outer diameter at the front end portion of a small-diameter rear housing member 38 as a small-diameter cylindrical member are formed or machined to be substantially equal respectively to the outer and inner diameters of the intermediate member 39. Then, they are held in such a state that the front end surface of the intermediate member 39 recedes or retracts by the second predetermined distance (L2) within the range of, preferably, 0.2 through 2 millimeters from the front end surfaces of the large and small-diameter rear housing members 37, 38, in which state a soldering is performed to make connections between the outer surface of the intermediate member 39 and the inner surface of the large-diameter rear housing member 37 as well as between the inner surface of the intermediate member 39 and the outer surface of the small-diameter rear housing member 38. Thereafter, a clutch contact surface 40 is formed by cutting the front end surfaces of the large and small-diameter rear housing members 37, 38 so that the distance between the front end surfaces of the large and small-diameter rear housing members 37, 38 and the front end surface of the intermediate member 39 becomes the first predetermined value (L1) such as within the range of 0.1 through 1 millimeter, preferably. Each of the large and small-diameter rear housing members 37, 38 is made of a magnetic metal such as iron or the like, while the intermediate member 39 is made of a non-magnetic metal such as stainless steel, copper or the like.

In the same way as is done in the first embodiment, the pilot clutch 20 is interposed between the clutch contact surface 40 formed at the front end surface of the rear housing 36 and the armature 23, and the electromagnet 24 is arranged between the large and small-diameter rear housing members 37, 38 behind the rear housing 36, so that the electromagnetic clutch 34 is constituted.

In this second embodiment, the intermediate member 39 may be made of a non-magnetic nonmetal such as resin or the like, in which case a suitable adhesive or cement may be employed to join or connect the intermediate member 39 with the large and small-diameter rear housing members 37, 38.

Furthermore, in the foregoing embodiments, the intermediate member 28 (or 39) is held or positioned to recede by the second predetermined distance (L2) from the front end surfaces of the large and small-diameter cylindrical members 26, 27 (or 37, 38) when joined to these members 26, 27 (or 37, 38). However, in joining to these members 26, 27 (or 37, 38), it is sufficient to make the intermediate member 28

(or 39) recede not by the second predetermined distance (L2) but more than the first predetermined distance (L1) from the front end surfaces of the large and small-diameter cylindrical members 26, 27 (or 37, 38). Thus, the front end surfaces of the large and small-diameter cylindrical members 26, 27 (or 37, 38) can then be cut until the front end surface of the intermediate member 28 (or 39) comes to recede therefrom by the first predetermined distance (L1).

As describe hereinabove, in the first embodiment shown in FIGS. 1 and 2, since the clutch contact surface 31 with good or satisfactory flatness is obtained by cutting the large and small-diameter cylindrical portions 26, 27 without cutting the intermediate member 28 which is made of a hard-to-cut, non-magnetic material, any substantial air gap is hardly formed between the clutch contact surface 31 and the end surface of the friction clutch 20. Therefore, it hardly occurs that the air gap causes the characteristic of the clutch 20 to be degraded, or that oil flown into the air gap forms an oil film to lower the responsiveness of the clutch operation. Further, since the clutch contact surface 31 is formed by cutting the front end surfaces of the large and small-diameter cylindrical portions 26, 27 and the portions 29, 30 which are melted and fused from parts of the large and small-diameter cylindrical portions 27, 28 to be deposited onto the intermediate member 28, the large and small-diameter cylindrical portions 27, 28 can be given magnetic paths which are separated by the non-magnetic member 28 and sufficiently large in respective areas for magnetic flux, and the clutch contact surface 31 can be improved in flatness in addition to being given the magnetic paths with the sufficiently large areas for magnetic flux.

Also in the first embodiment typically shown in FIG. 2, the outer and inner circumferential edges of the intermediate member 28 are joined by the electron beam welding respectively to the inner circumferential edge of the large-diameter cylindrical portion 26 and the outer circumferential edge of the small-diameter cylindrical portion 27. Therefore, it can be realized that the large and small-diameter cylindrical portions 26, 27 can be accurately welded by the electron beam welding to the outer and inner circumferential edges of the intermediate member 28.

Also in the first embodiment typically shown in FIG. 2, the outer and inner circumferential edges of the intermediate member 28 are joined by the laser beam welding respectively to the inner circumferential edge of the large-diameter cylindrical portion 26 and the outer circumferential edge of the small-diameter cylindrical portion 27. Therefore, it can be realized that the large and small-diameter cylindrical portions 26, 27 can be accurately welded by the laser beam welding to the outer and inner circumferential edges of the intermediate member 28.

Also in the first embodiment typically shown in FIG. 2, the distance (L1) between the clutch contact surface 31, formed by cutting the front end surfaces of the large and small-diameter cylindrical portions 26, 27, and the receding front end surface of the intermediate member 28 is determined to be chosen within the range of 0.1 through 1 millimeter. Since the distance (L1) between the clutch contact surface 31 and the front end surface of the intermediate member 28 is determined to be within the range of 01. through 1 millimeter, it can be realized to easily form the clutch contact surface 31 which is sufficiently high in rigidity as well as good in flatness.

Also in the first embodiment typically shown in FIG. 2, the intermediate member 28 is positioned relative to the large and small-diameter cylindrical portions 26, 27 with the front end surface of the former receding or retracting by the first predetermined distance (L1) from the front end surfaces of the latter, in which state the outer and inner circumferential edges of the large and small-diameter cylindrical portions 26, 27 are welded respectively to the outer and inner circumferential edges of the intermediate member 28. Then, cutting is performed on the front end surfaces of the large and small-diameter cylindrical portions 26, 27 as well as on the portions which are melted and fused by welding from the parts of the large and small-diameter cylindrical portions 26, 27 to be deposited onto the intermediate member 28. Therefore, the large and small-diameter cylindrical portions 26, 27 can be given magnetic paths which are separated by the non-magnetic member 28 and sufficiently large in respective areas for magnetic flux, and the clutch contact surface 31 can be improved in flatness in addition to being given the magnetic paths with the sufficiently large areas for magnetic flux.

Further, in the second embodiment shown in FIG. 3, since the large and small-diameter cylindrical portions 37, 38 are joined to the intermediate member 39 with the front end surface of the intermediate member 39 receding or retracting by the first predetermined distance (L1) from the front end surfaces of the large and small-diameter cylindrical portions 37, 38, and since the clutch contact surface 40 with good or satisfactory flatness is obtained by cutting the large and small-diameter cylindrical portions 37, 38 only, any substantial air gap is hardly formed between the clutch contact surface 40 and the end surface of the friction clutch 20. Therefore, it hardly occurs that the air gap causes the characteristic of the clutch 20 to be degraded, or that oil flown into the air gap forms an oil film to lower the responsiveness of the clutch operation. Further, since the inner diameter at the front end portion of the large-diameter cylindrical portion 37 and the outer diameter at the front end portion of the small-diameter cylindrical portion 38 are made to be substantially the same respectively as the outer and inner diameters of the intermediate member 39, the large and small-diameter cylindrical portions 37, 38 can be given magnetic paths which are separated by the non-magnetic member 39 having a thickness required to manufacture and sufficiently large in respective areas for magnetic flux, and the clutch contact surface 40 can be improved in flatness in addition to being given the magnetic paths with the sufficiently large areas for magnetic flux.

Also in the second embodiment shown in FIG. 3, the outer and inner surfaces of the intermediate member 39 are joined by either of welding, soldering and adhesive respectively to the inner surface of the large-diameter cylindrical portion 37 and the outer surface of the small-diameter cylindrical portion 38. Since the large and small-diameter cylindrical portions 37, 38 are joined by either of welding, soldering and adhesive to the intermediate member 39, the magnetic path forming member 5 can be easily manufactured at a low cost.

Obviously, numerous modifications and variations of the present invention are possible in light of the above teachings. It is therefore to be understood that within the scope of the appended claims, the present invention may be practiced otherwise than as specifically described herein.

What is claimed is:

1. An electromagnetic clutch comprising:
   a first magnetic member with a large-diameter cylindrical portion made of a magnetic metal;
   a second magnetic member with a small-diameter cylindrical portion made of a magnetic metal and contained in said large-diameter cylindrical portion;
   an annular member of a non-magnetic material interposed between and joined to said large and small diameter cylindrical portions to constitute a magnetic path forming member having a clutch contact surface at a front end thereof;

a friction clutch arranged between the clutch contact surface formed at the front end surface of said magnetic path forming member and an armature;

an electromagnet arranged behind the magnetic path forming member for generating magnetic flux between said large and small-diameter cylindrical portions, wherein the inner diameter of said clutch contact surface at the front end portion of said large-diameter cylindrical portion and the outer diameter of said clutch contact surface at the front end portion of said small-diameter cylindrical portion are substantially the same respectively as the outer and inner diameters of said annular member;

the outer and inner surfaces of said annular member are joined respectively to the internal surface of said large-diameter cylindrical portion and the outer surface of said small-diameter cylindrical portion with the front end surface of said annular member receding a predetermined distance from said clutch contact surface.

2. The electromagnetic clutch as set forth in claim 1, wherein the outer and inner circumferential edges of said annular member are joined by electron beam welding respectively to the inner circumferential edge of said large-diameter cylindrical portion member and the outer circumferential edge of said small-diameter cylindrical portion.

3. The electromagnetic clutch as set forth in claim 1, wherein the outer and inner circumferential edges of said annular member are joined by laser beam welding respectively to the inner circumferential edge of said large-diameter cylindrical portion and the outer circumferential edge of said small-diameter cylindrical portion.

4. The electromagnetic clutch as set forth in claim 1, wherein the distance (L1) between said clutch contact surface, formed by cutting the front end surfaces of said large and small-diameter cylindrical portions, and the front end surface of said annular member is determined to be within the range of 0.1 through 1 millimeter.

5. The electromagnetic clutch as set forth in claim 1, wherein the outer and inner surfaces of said annular member are joined by either of welding, soldering and adhesive respectively to the inner surface of said large-diameter cylindrical portion and the outer surface of said small-diameter cylindrical portion.

6. The electromagnetic clutch as set forth in claim 1, further comprising weld beads joining the annular member to the first and second magnetic members, wherein the weld beads are formed from the first and second members, and not from the annular member.

7. A method of manufacturing a magnetic path forming member for an electromagnetic clutch comprising a first magnetic member with a large-diameter cylindrical portion made of a magnetic metal, a second magnetic member with a small-diameter cylindrical portion made of a magnetic metal and contained in said large-diameter cylindrical portion, an annular member of a non-magnetic material interposed between and joined to said large and small-diameter cylindrical portions to constitute said magnetic path forming member having a clutch contact surface at a front end thereof, a friction clutch arranged between the clutch contact surface formed at the front end surface of said magnetic path forming member and an armature, and an electromagnet arranged behind said magnetic path forming member for generating magnetic flux between said large and small-diameter cylindrical portions, said method comprising:

making the inner diameter of said clutch contact surface at the front end portion of said large-diameter cylindrical portion and the outer diameter of said clutch contact surface at the front end portion of said small-diameter cylindrical portion substantially the same respectively as the outer and inner diameters of said annular member;

positioning said annular member relative to said first and second magnetic members with the front end surface of said annular member receding more than a predetermined distance (L1) from the front end surfaces of said large and small-diameter cylindrical portions;

joining the outer and inner surfaces of said annular member respectively to the inner surface of said large-diameter cylindrical portion and the outer surface of said small-diameter cylindrical portion; and forming said clutch contact surface by cutting the front end surfaces of said large and small-diameter cylindrical portions so that the front end surface of said annular member recedes by said predetermined distance (L1) from the front end surfaces of said large and small-diameter cylindrical portions.

* * * * *